3,004,844
COMPOSITION AND METHOD FOR CONTROL OF VEGETATION
Leonard M. Stahler, Pacific Palisades, and James D. Stone, Los Angeles, Calif., assignors, by mesne assignments, to United States Borax & Chemical Corporation
No Drawing. Filed Nov. 27, 1953, Ser. No. 394,902
2 Claims. (Cl. 71—2.4)

This invention relates to chemical compositions for control of vegetation and methods of application of these compositions for killing weeds or controlling weed growth. Here, the term "weeds" is used in its broadest sense and is meant to include all plants which grow in areas or situations where they are not wanted. The term "plants" is meant to include all stages of development from the germinating seed to mature established plants; whether annual, biennial or perennial in growth habit.

The prime object of the invention is to provide compositions for the purpose of controlling or eliminating weed growth which are more economical and more effective than previously used chemical herbicidal compositions.

The invention is based, in part, upon the observation that certain presently used chemical herbicidal compounds—hereinafter referred to as the compounds of the invention—when combined in certain proportions and applied to weeds or to the soil on which weed seeds will germinate, are more effective than when the chemical herbicidal compounds are applied separately.

The compounds of the invention are composed of one, or more, materials selected from each of the following groups:

Group I includes: Organic hormone or growth regulating type herbicides such as 2,4-dichlorophenoxyacetic acid—hereinafter referred to as 2,4-D; 2,4,5-trichlorophenoxyacetic acid—hereinafter referred to as 2,4,5-T; 2 - methyl-4-chlorophenoxyacetic acid—hereinafter referred to as MCP; salts, and substituted organic ammonium salts, and amides, of 2,4-D, 2,4,5-T or MCP.

Group II includes: The sodium or calcium borate ores or salts, and particularly, those borate ores and borate salts that have established herbicidal qualities or characteristics; such as sodium metaborate ($Na_2B_2O_4.4H_2O$); sodium tetraborate ($Na_2B_4O_7.10H_2O$); sodium pentaborate ($Na_2B_{10}O_{16}.10H_2O$); Gerstley Borate—a natural occurring mixture of Ulexite ($NaCaB_5O_9.8H_2O$) and Colemanite ($Ca_2B_6O_{11}.5H_2O$); and calcium borates of which Colemanite ($Ca_2B_6O_{11}.5H_2O$) is representative. Such borates may be used with or without their normal water of hydration. Polyborates made up of mixtures of such borates and of such borates with boric acid may also be used.

For the purpose of this invention the aforementioned compounds of Group I, which are presently considered as plant hormones and used in the control of weeds with various methods of application and at rates of application generally at a range of ¼ to 5 lbs. per acre, must, in the application of the present invention be used at rates in excess of 10 lbs. per acre. There is no upper limit to the rate of application suggested by this invention except that dictated by economy. In present general use of compounds of Group I as herbicides they are considered as selective herbicides in that they generally eliminate susceptible weed species of the broad-leaved, or dicotyledonous type, while being ineffective in eliminating weed species of the grass, or monocotyledonous species. Under the practice of the present invention, and in using 10 lbs. or greater quantities per acre of compounds from Group I, and in mixtures with selected compounds from Group II, weed control is non-selective; and depending on the method and intensity of of application, may be of the temporary or permanent soil sterilization type.[1]

In practical application of this invention, herbicidal formulations composed of one, or more, compounds from each of Group I and Group II, as indicated heretofore, may be so selected as to be applied
  (a) Dissolved in a water spray solution.
  (b) Suspended as finely divided particles in water spray as a suspension, sludge, or slurry.
  (c) Applied by hand or mechanical spreading as a dry mixture of low relative water solubility.

As examples of these three types of formulation the following have been observed to be especially efficient:

(a) The sodium salt of 2,4-D or MCP—2% to 18%; sodium pentaborate, sodium metaborate or polyborates in the pentaborate range—82% to 98%. This formulation has proven highly efficient in non-selective elimination of growing weeds when applied as a water solution spray to the standing foliage, and in addition, gives a period of temporary sterility at rates of application of ½ to 4 lbs. of the compound per 100 sq. ft. of area.

Applications of formulations of this type applied as a water spray solution at 2 or 4 lbs. per sq. rd. in May of 1953 on field bindweed (*Convolvulus arvensis*) at two locations showed, in October of 1953, a higher percentage control of this weed than any comparable treatment with presently used soil sterilant herbicides. Similar rates and methods of application of compounds of this type to plots infested with burr ragweed (*Franseria spp.*) in early May of 1953 showed complete control of this weed when the plots were inspected in October of 1953. Both of the cited field tests on plots treated with compositions of these formulations were entirely free of annual weed growth indicating a high degree of residual soil surface sterility.

(b) A formulation composed of 2,4-D acid; 2,4,5-T acid or MCP acid—2% to 18%; Gerstley Borate ore (a natural occurring mixture of Ulexite, $NaCaB_5O_9.8H_2O$, and Colemanite, $Ca_2B_6O_{11}.5H_2O$)—82% to 98%. These ingredients are finely ground to pass through a U.S. Std. Sieve No. 100, and are made up for application to growing plants in solution or for application directly to the soil by adding from 1 to 8 lbs. of the mixture to 1 gallon of water, and applying 1 gallon of the slurry, or suspension, to 100 sq. ft. of surface area.

Experimental applications formulated as above with 4.5% 2,4-D acid, 95.5% Gerstley Borate ore, and applied at 2 lbs. per 100 sq. ft. as a sprayable slurry, or suspension, in water on May 19, 1953 in Orange County, California, on frequent inspections showed no annual weed growth throughout the summer season. Soil samples taken from the surface two inches of these treated plots in October 1953, placed in the greenhouse, sown with a variety of crop and weed seeds, and well watered, showed residual toxicity to the germinating seedlings of many species equal to check soil samples freshly treated with equivalent quantities of the borate ore and 2,4-D acid on October 20, 1953. This test indicates the stability of the combined herbicides in the soil surface and long residual toxicity.

(c) The acid, or the sodium salts, of 2,4-D; 2,4,5-T or MCP—2% to 18%; sodium tetraborate, Gerstley Borate ore, or calcium borate ores—82% to 98% for dry application by hand, or machine, spreading. These compounds are either thoroughly mixed by mechanical agitation, or the compound, or compounds, from Group I are impregnated on particles of compound, or compounds of Group II through the process of slightly moistening compound, or compounds, of Group I with water and the addition of 1/10 of 1% sticker such as

[1] Robbins, Crafts and Raynor: Weed Control, 2nd edition, McGraw-Hill Book Co., N.Y., 1952, page 241, para 1.

Armour Sticker, or similar commercial preparations, and evenly distributed by agitation, and dried by artificial heat or natural aeration. Compounds of the invention so formulated have been efficiently applied dry at rates of 2 to 5 lbs. of the mixed compounds per 100 sq. ft. of surface area. Mixtures of 95% sodium tetraborate and 5% 2,4-D acid formulated as above and applied to the soil by hand spreading in April of 1953 in Orange County, California, at the rate of 2 lbs. of the total mixture per 100 sq. ft. of area, gave complete elimination of annual weed growth throughout the growing season.

The above formulations and methods of application are listed only in the way of example and are in no way presented to indicate that the formulations of compounds of this invention are limited to the cited examples. Combinations of compounds from both Group I and Group II may be selected so as to give a high soluble fraction derived from Group I and a less soluble fraction from Group II, or vice versa, in order to accomplish both shallow and deep leaching of the herbicides where these characteristics are desirable in the control of deep or shallow rooted, or germinating, plants. As examples of these combinations we cite the following:

(1) A sodium salt of 2,4-D, 8%; Gerstley Borate, 92%. With this formulation the readily soluble sodium salt of 2,4-D is leached to lower soil depths by moderate rainfall for the elimination of deep rooted perennial weeds, such as Canada Thistle (*Circium arvense*); whereas, the relatively slightly soluble Gerstley Borate, being less readily leached, remains in the surface soil and controls, or eliminates, shallow rooted weed species, such as Bermuda grass (*Cynodon dactylon*).

(2) The acid of 2,4-D, 8%; borax ($Na_2B_4O_7$), 92%. In this cited example of formulation the slightly soluble 2,4-D acid remains in the surface soil and controls, or eliminates, such shallow rooted weed species as wild mustard (*Brassica spp.*); whereas, with moderate to heavy precipitation the more soluble borax is differentially leached to lower soil levels and controls, or eliminates, such deep rooted perennial weed species as leafy spurge (*Euphorbia esula*).

The above cited formulations are listed only by way of example and are not presented to indicate that the formulations of the compounds of this invention are limited to the cited examples.

The relative percentages of compounds from Group I and Group II listed in the above cited examples under a, b, and c, are not presented to indicate the limits of the compositions of this invention. In general, 2% to 18% of ingredients from Group I, combined with 98% to 82% respectively, of ingredients from Group II have, in field tests, satisfactorily controlled, or eliminated, a wide range of weed species. Ingredients from Group I and Group II may be combined in a wider range of relative proportions (either more or less of the hormone ingredient than the range stated) to form other herbicidal compositions for use on specific weeds, or under special conditions of soil and precipitation, or limiting economic factors.

Use of compounds of the invention as herbicides made up of one, or more, compounds selected from Group I and Group II offers three distinct advantages not unique to compounds from Group I and Group II when used separately.

(1) The addition of the borate ores, or borate salts, to one or more of the compounds of Group I, reduces rate of activity of soil bacteria and fungi and resultant breakdown of the 2,4-D; 2,4,5-T, MCP, or related herbicidal compounds. Breakdown of these organic compounds through the action of bacteria or fungi in the soil has been recognized by Crafts[2], De Rose[4], and others, as a factor limiting the action of these herbicides. The depressing effects of borate salts and ores in water solution on the activity of micro-organisms have been long established and recognized. The borate salts or ores, while having proven herbicidal action in themselves, contribute to the conservation of the organic herbicide, or herbicides, selected from Group I and permit of longer, more effective action in the control of weeds.

(2) The addition of borate ores, or borate salts, selected from Group II, to organic compounds selected from Group I, reduces chemical breakdown of the compounds from Group I by regulating, or buffering, the pH of the soil water solution. Crafts[3] has demonstrated that breakdown of organic herbicidal compounds of the hormone type to less complex ineffective substances takes place most rapidly in acid soils, i.e., soil water solutions with a pH 6 or lower.

In use of compounds of this invention the borate ores or borate salts from Group II, in addition to having unique herbicidal qualities, further, when mixed with one or more compounds from Group I, conserve the organic hormone type herbicides in the soil for longer, more effective herbicidal action through adjusting the pH of the soil water solution and prevenitng chemical breakdown of the organic compounds which would normally take place in an acid soil water solution.

As an example, an adobe garden soil from Los Angeles County, California, with a pH of 5.89 when determined by standard procedures, showed a pH of 6.61 when treated with the equivalent of 500 lbs. per acre of a formulation of this invention composed of 7% 2,4-D acid and 93% sodium tetraborate. As an indication of the buffering effect of the borate salts on pH changes of the soil water solution, 325 ml. of distilled water with a pH of 6.96, after the addition of 0.2535 gm. of 2,4-D acid showed a pH of 2.82; with the addition of 1.4550 gm. of borax pentahydrate showed a pH of 9.18; with the addition of 0.2535 gm. of 2,4-D acid and 1.4550 gm. of borax pentahydrate showed a pH of 9.05. The concentrations of 2,4-D acid, borax pentahydrate, or mixtures of the two compounds in these test solutions are within the range that is secured in soil water solutions in practical applications of certain formulations of herbicides in this invention.

(3) The combination of one, or more, compounds from both Group I and Group II, while taking advantage of the established herbicidal action of compounds selected from Group II, improves the efficiency of herbicidal action of compounds selected from Group I, above, by buffering the pH of the soil water solution in which the several compounds are dissolved. Through buffering of this soil water solution and maintaining the pH in the neutral or alkaline range, ionization of compounds selected from Group I, above, is accelerated, producing anions of the active particle. These anions, carrying a negative charge, are not readily adsorbed on bacteria, fungi or soil colloids, and further, being ionized are more readily taken up by plant roots.[5]

Field plot tests of several formulations of this invention under the widely divergent weather conditions experienced in Orange County, California, and three locations in the State of Kansas in the 1953 season, conclusively demonstrated the advantages of the formulations of this invention over the action of single ingredients used in the formulations of the compounds as herbicides for controlling annual and perennial weeds. Applications of water soluble, sprayable formulations composed of soluble pentaborate (Polybor) 92%; the sodium salt of 2,4-D, 8%, applied at 2 or 4 lbs. per sq. rd. in May 1953, on field bindweed (*Convolvulus arvensis*) at two locations showed, in October of 1953, a higher percentage control of this weed than any com-

---

[2] Robbins, Crafts and Raynor: Weed Control, 2nd edition, McGraw-Hill Book Co., N.Y., 1952, page 241, para. 1.

[4] De Rose: Botanical Gazette, vol. 107, June 1946, pages 583 and 589.

[3] Crafts: Hilgardia, vol. 19, No. 5, April 1949, page 155, para. 2.

[5] Crafts: Science 108 (2,795) –85–86, 1948.

parable treatment with presently used soil sterilant herbicides. Similar rates and methods of application of compounds of this type to plots infested with burr ragweed (*Franseria spp.*) in early May of 1953 showed complete control of this weed when the plots were inspected in October of 1953. Both of the cited field tests on plots treated with compositions of these formulations were entirely free of annual weed growth indicating a high degree of residual soil surface sterility. Experimental applications formulated with 5.0% 2,4-D acid, 95% Gerstley Borate ore, and applied at 2 lbs. per 100 sq. ft. as a sprayable slurry, or suspension, in water on May 19, 1953, in Orange County, California; on frequent inspections showed no annual weed growth throughout the summer season. Soil samples taken from the surface two inches of these treated plots in October 1953, placed in the greenhouse, sown with a variety of crop and weed seeds, and well watered, showed residual toxicity to the germinating seedlings of many species equal to check soil samples freshly treated with equivalent quantities of the borate ore and 2,4-D acid on October 20, 1953. This test indicates the stability of combined herbicides in the soil surface and long residual toxicity. Mixtures of 95% sodium tetraborate and 5% 2,4-D acid formulated as above, and applied to the soil by hand application as a dry granular material in April of 1953, in Orange County, California, at the rate of 2 lbs. of the total mixture per 100 sq. ft. of area, gave complete elimination of annual weed growth throughout the growing season.

The compositions of this invention are more effective and economical than previously used herbicides in that they combine the herbicidal qualities of two distinct groups of presently used compounds in formulations that are economical and safe to apply and use. The combinations of recognized herbicides from Group I and Group II have the further advantage of improving and extending the non-selective herbicidal action of compounds from Group I when these compounds are applied to the soil.

We claim:
1. A herbicidal composition for application to soil to inhibit growth of plants therein, said composition consisting essentially of an organic herbicide of hormone type selected from the group which consists of 2,4-dichlorophenoxyacetic acid, 2,4,5-trichlorophenoxyacetic acid, 2-methyl-4-chlorophenoxyacetic acid, and the salts and substituted organic ammonium salts and amides of said acids; and a herbicidal agent which, when added to the soil, inhibits the destruction of said organic herbicide by micro-organisms in the soil, said herbicidal agent being selected from the group consisting of sodium and calcium borates, said organic herbicide being present in the composition in herbicidal quantity, and the borate being present in the composition in a ratio of borate to organic herbicide between about 5:1 and about 50:1.

2. The method of treating soil to inhibit the growth of plants therein, which method consists essentially of applying to the soil an organic herbicide of hormone type and a herbicidal agent which, when added to the soil, inhibits the destruction of said organic herbicide by micro-organisms in the soil; said organic herbicide being selected from the group which consists of 2,4-dichlorophenoxyacetic acid, 2,4,5-trichlorophenoxyacetic acid, 2-methyl-4-chlorophenoxyacetic acid, and the salts and substituted organic ammonium salts and amides of said acids, and being applied to the soil in herbicidal quantity; and said herbicidal agent being selected from the group which consists of sodium and calcium borates, and being applied to the soil in a ratio of borate to organic herbicide between about 5:1 and about 50:1.

References Cited in the file of this patent

UNITED STATES PATENTS

| | | |
|---|---|---|
| 2,291,693 | Colla | Aug. 4, 1942 |
| 2,643,947 | Connell | June 30, 1953 |
| 2,690,387 | O'Brien et al. | Sept. 28, 1954 |
| 2,700,604 | Knight | Jan. 25, 1955 |
| 2,709,648 | Ryker et al. | May 31, 1955 |

FOREIGN PATENTS

| | | |
|---|---|---|
| 598,072 | Great Britain | Feb. 10, 1948 |
| 598,104 | Great Britain | Feb. 10, 1948 |
| 598,105 | Great Britain | Feb. 10, 1948 |

OTHER REFERENCES

Principles of Weed Control, Ahlgren et al. (John Wiley and Sons, Inc.), New York, 1951, pages 261–264.

Litzenberger: "Montana Agricultural Experiment Station War Circular 2," 1943, 10 pages (page 7 applied).

Crafts et al. in "Hilgardia," vol 10, No. 10, December 1936, pp. 361–374, 411 and 412.

Effect of Borate Additives on Herbicides, by J. D. Stone and D. W. Rake. Agricultural Chemicals, May 1955.